United States Patent
Furukawa et al.

(10) Patent No.: US 6,233,513 B1
(45) Date of Patent: May 15, 2001

(54) METHOD AND SYSTEM FOR COMPUTING A VEHICLE BODY SLIP ANGLE IN A VEHICLE MOVEMENT CONTROL

(75) Inventors: Yoshimi Furukawa; Yasuji Shibahata, both of Wako; Masato Abe, 33-80 Higashi-Tamagawagakuen 1-chome, Machida-shi, Tokyo, all of (JP)

(73) Assignees: Masato Abe; Honda Giken Kogyo Kabushiki, both of Tokyo (JP)

( * ) Notice: Subject to any disclaimer, the term of this patent is extended or adjusted under 35 U.S.C. 154(b) by 0 days.

(21) Appl. No.: 09/192,894

(22) Filed: Nov. 17, 1998

(30) Foreign Application Priority Data

| Nov. 27, 1997 | (JP) | 9-326540 |
| Mar. 17, 1998 | (JP) | 10-067192 |
| Aug. 21, 1998 | (JP) | 10-235415 |
| Aug. 21, 1998 | (JP) | 10-235417 |

(51) Int. Cl.$^7$ .................................................. G06F 7/00
(52) U.S. Cl. .................................. 701/74; 701/1; 303/146
(58) Field of Search .......................... 701/1, 41, 72, 701/80, 74, 75; 303/146, 150

(56) References Cited

U.S. PATENT DOCUMENTS

| 4,872,116 | * | 10/1989 | Ito et al. ................................. 704/41 |
| 5,513,907 | * | 5/1996 | Kiencke et al. ...................... 303/150 |
| 5,579,245 | * | 11/1996 | Kato ..................................... 702/150 |
| 5,640,324 | * | 6/1997 | Inagaki ................................. 701/70 |
| 5,668,724 | * | 9/1997 | Ehret et al. ............................ 701/80 |
| 5,747,682 | * | 5/1998 | Hirano ................................ 73/118.1 |
| 5,839,799 | * | 11/1998 | Fukada ................................. 303/146 |
| 5,899,952 | * | 5/1999 | Fukada ................................... 701/74 |
| 5,925,083 | * | 7/1999 | Ackermann .......................... 701/41 |
| 5,931,546 | * | 8/1999 | Nakashima et al. ................ 303/146 |
| 5,964,819 | * | 10/1999 | Naito .................................... 701/72 |
| 6,035,251 | * | 3/2000 | Hac et al. ............................. 701/70 |
| 6,053,583 | * | 4/2000 | Izumi et al. ........................ 303/150 |

OTHER PUBLICATIONS

"Sliding Mode Control", published by Corona Publishing Company, pp. 1–40.

\* cited by examiner

*Primary Examiner*—Michael J. Zanelli
*Assistant Examiner*—Eric M. Gibson
(74) *Attorney, Agent, or Firm*—Arent Fox Kintner Plotkin & Kahn

(57) ABSTRACT

Provided are a method and system for computing a vehicle body slip angle in the vehicle movement control so as to allow the vehicle movement to be controlled with an adequate response and stability for practical purposes even without directly detecting or accurately estimating the frictional coefficient between the road surface and the tire. A tire slip angle is computed from a yaw rate, a vehicle speed, a vehicle body slip angle and a road wheel steering angle; a cornering force is computed from a dynamic model of the tire by taking into account at least the tire slip angle; and a hypothetical vehicle body slip angle is computed from the cornering force, the vehicle speed and the yaw rate; the tire slip angle being computed by feeding back the hypothetical vehicle body slip angle in a recursive manner.

12 Claims, 16 Drawing Sheets

METHOD AND SYSTEM FOR COMPUTING A VEHICLE BODY SLIP ANGLE IN A VEHICLE MOVEMENT CONTROL

TECHNICAL FIELD

The present invention relates to a method and system for computing a vehicle body slip angle in a vehicle movement control which assist the vehicle operator so as to improve the responsiveness and stability of the vehicle.

BACKGROUND OF THE INVENTION

There have been a number of proposals to improve the turning performance of a vehicle by controlling the braking force and/or the traction force individually for the front and rear wheels or for the right and left wheels, and most of them are designed to achieve a desired vehicle handling by detecting a dynamic state of the vehicle body, such as a yaw rate, for a feedback control. However, as long as the vehicle contacts the road surface via tires, the handling of the vehicle is dictated by the dynamic characteristics of the tires. In particular, in the region where the cornering force saturates, it becomes extremely difficult to control the vehicle so as to achieve a desired cornering performance solely on the basis of the dynamic state of the vehicle body.

The inventors therefore previously proposed, in copending U.S. patent application Ser. No. 08/848,498 filed May 8, 1997, a method and system for controlling the handling of a vehicle which achieve a favorable responsiveness and stability even when the dynamic characteristics are outside a linear region. The contents of this copending patent application are hereby incorporated in this application by reference. This technology produces a certain yawing moment which gives rise to a favorable responsiveness to a steering maneuver involving braking (or traction) even in the nonlinear region of the dynamic tire characteristics by controlling the fore-and-aft forces of the tires according to the sliding mode control process (refer to "Sliding Mode Control", published by Corona Publishing Company). The outline of this control process is briefly described in the following.

The basis of this control process consists of basic equations of motion of the vehicle on a two-dimensional plane which take into account the yawing moment around the gravitational center of the vehicle body, and these equations are given in the following.

$$mV(d\beta/dt+\gamma)=Y_F+Y_R \qquad (1)$$

$$I(d\gamma/dt)=L_F Y_F - L_R Y_R + M_Z \qquad (2)$$

where m: vehicle mass
V: vehicle speed
γ: yaw rate
$Y_F$: front wheel cornering force (sum for right and left wheels)
$Y_R$: rear wheel cornering force (sum for right and left wheels)
I: yaw moment of inertia
$L_F$: distance between the front axle and the gravitational center
$L_R$: distance between the rear axle and the gravitational center
$M_Z$: yawing moment due to the braking or traction force around the gravitational center (see FIG. 9)

The sliding surface S defining a desired response which is ultimately desired to be achieved can be expressed by the following equation.

$$S=d\beta/dt+c\{\beta+a[(Y_F+Y_R)/mV-\gamma]\}=0 \qquad (3)$$

where c, a and k are appropriately selected constants. The quality of the control process depends on the selection of these constants.

Equation (3) causes the vehicle body slip angle β to converge to zero. The sliding condition for achieving this can be given by the following equation.

$$dS/dt=-kS \qquad (4)$$

From Equations (3) and (4), the following relation can be derived.

$$d^2\beta/dt^2+c\{d\beta/dt+a[(dY_F/dt)/mV+(dY_R/dt)/mV-d\gamma/dt]\}+k(d\beta/dt)+kc\{\beta+a[(Y_F+Y_R)/mV-\gamma]\}=0 \qquad (5)$$

If a yawing moment $M_Z$ which satisfies Equation (5) can be obtained in a both reasonable and practical form by using Equations (1) and (2), it can be used a control rule. From Equation (1), one can obtain $$d^2\beta/dt^2=\{(dY_F/dt)+(dY_R/dt)\}/mV-d\gamma/dt \qquad (1-2)$$

When this is substituted into Equation (5), one can obtain $$(1+ca)[(dY_F/dt)/mV+(dY_R/dt)/mV-d\gamma/dt]+kca[(Y_F+Y_R)/mV-\gamma]+(k+c)d\beta/dt+kc\beta=0 \qquad (6)$$

Equation (2) produces $$d\gamma/dt=(L_F Y_F - L_R Y_R + Mz)/I \qquad (2-2)$$

When this is substituted into Equation (6), one can obtain $$\{(dY_F/dt)+(dY_R/dt)\}/mV-(L_F Y_F - L_R Y_R + Mz)/I+[kca/(1+ca)]\cdot[(Y_F+Y_R)/mV-\gamma]+(d\beta/dt)[(k+c)/(1+ca)]+\beta[kc/(1+ca)]=0 \qquad (7)$$

Equation (7) produces the following equation which may serve as a basic control rule.

$$Mz=-(L_F Y_F - L_R Y_R)+(I/mV)\cdot\{(dY_F/dt)+(dY_R/dt)\}+kca/(1+ca)\cdot I\cdot[(Y_F+Y_R)/mV-\gamma]+I(d\beta/dt)[(k+c)/(1+ca)]+I\beta[kc/(1+ca)] \qquad (8)$$

The above equation means that a yawing moment which achieves a favorable response can be obtained from such parameters as the cornering forces $Y_F$ and $Y_R$, the yaw rate γ, the vehicle speed V, and the vehicle body slip angle β. Since the tread $L_{TR}$ is fixed, once the yawing moment Mz is given, the right and left ratio of the fore-and-aft forces or the braking (or traction) forces for the final control result can be determined from the following equation.

$$Mz=(X_R-X_L)L_{TR} \qquad (9)$$

By controlling the fore-and-aft forces individually for the right and left wheels according to a known method (braking force control: Japanese patent laid open publication 7-69190, traction force control: Japanese patent laid open publication 7-17277), it becomes possible to improve the response and stability of the vehicle under conditions where the dynamic properties of the tires exceed the linear range.

In the above mentioned algorithm, it was pre-supposed that at least the frictional coefficient μ between the tires and the road surface and the vehicle body slip angle β are known. However, sensors for directly detecting the frictional coefficient between the tires and the road surface and the vehicle body slip angle have not been available in such forms as to be applicable to mass produced vehicles, and it has been customary to estimate the former from the difference in the rotational speeds of the front and rear wheels, and the latter from such readily detectable vehicle state variables as the yaw rate and the lateral acceleration. In other words, according to the prior art, the control accuracy has been strongly dictated by the precision in the values which can only be indirectly estimated.

BRIEF SUMMARY OF THE INVENTION

In view of such problems of the prior art, a primary object of the present invention is to provide a method and system for computing a vehicle body slip angle in a vehicle movement control which are sufficiently accurate for practical purposes without requiring any directly measured or accurately estimated values of the frictional coefficient between the tires and the road surface and the vehicle body slip angle.

A second object of the present invention is to provide a method and system for computing a vehicle body slip angle in a vehicle movement control which allow a stable control of vehicle movement even when the data for the control process is limited or inaccurate.

A third object of the present invention is to provide a method and system for computing a vehicle body slip angle in a vehicle movement control which is so simple that it can be readily implemented in an onboard computer at a minimum cost.

A fourth object of the present invention is to provide a method and system for computing a vehicle body slip angle in a vehicle movement control which is so simple that it can be readily implemented so as to operated on a real time basis.

According to the present invention, these and other objects of the present invention can be accomplished by providing a method for computing a vehicle body slip angle in a vehicle movement control, comprising the steps of: computing a tire slip angle $\alpha$ from a yaw rate $\gamma$, a vehicle speed V, a vehicle body slip angle $\beta$ which is given as an initial value or a preceding computed value and a road wheel steering angle $\delta$; computing a cornering force Y from a dynamic model of the tire by taking into account at least the tire slip angle $\alpha$; and computing a hypothetical vehicle body slip angle $\beta_e$ from the cornering force Y, the vehicle speed V and the yaw rate $\gamma$; wherein the tire slip angle $\alpha$ is computed by feeding back the hypothetical vehicle body slip angle $\beta_e$.

Thus, the hypothetical vehicle body slip angle $\beta_e$ is given by a recursive computation in a closed-loop system, and the stability of the vehicle movement control is ensured as a result even without obtaining the vehicle body slip angle at any high precision. For instance, when the frictional coefficient $\mu$ between the tire and the road surface in the tire dynamic model may be fixed at a value in the vicinity of 1.0, a particularly favorable performance of the control system can be attained. However, even though detecting the frictional coefficient between the tires and the road surface is not essential for stable and satisfactory control of vehicle motion, it was found that accurate information on the frictional coefficient still improves the performance of the system. To achieve this goal, the method of the present invention may further include the step of estimating the frictional coefficient between the tire and the road surface for use in the tire dynamic model according to a relation between a cornering force $Y_e$ computed from the yaw rate and a lateral acceleration $G_Y$ and a tire slip angle $\alpha_e$ computed from a vehicle body slip angle $\beta_D$ which is in turn computed from the yaw rate, the lateral acceleration and the vehicle speed.

According to a preferred embodiment of the present invention, the step of computing a hypothetical vehicle body slip angle $\beta_e$ from the cornering force Y, the vehicle speed V and the yaw rate $\gamma$ includes the use of the following equation;

$$\beta_e = \int \{[(Y_F + Y_R)/mV] - \gamma\} dt$$

where
- m: vehicle mass
- $Y_F$: front wheel cornering force (sum for right and left wheels)
- $Y_R$: rear wheel cornering force (sum for right and left wheels).

This equation allows the computation of the vehicle body slip angle at a high precision if the fore-and-aft speed $V_x$ of the vehicle body is sufficiently greater than the vehicle body slip angle $V_y$, and the changes in the fore-and-aft speed $V_x$ are relatively small, but under extreme conditions when such a relation does not hold, the following more precise equations may be used.

$$V_y = \int \{(Y_F + Y_R)/m - \gamma V_x\} dt$$

$$\beta_e = \tan^{-1}(V_y/V_x).$$

Typically, the vehicle speed is measured by a wheel speed sensor, and the output of such a wheel sensor will give a satisfactory approximation of the fore-and-aft speed $V_x$ of the vehicle.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
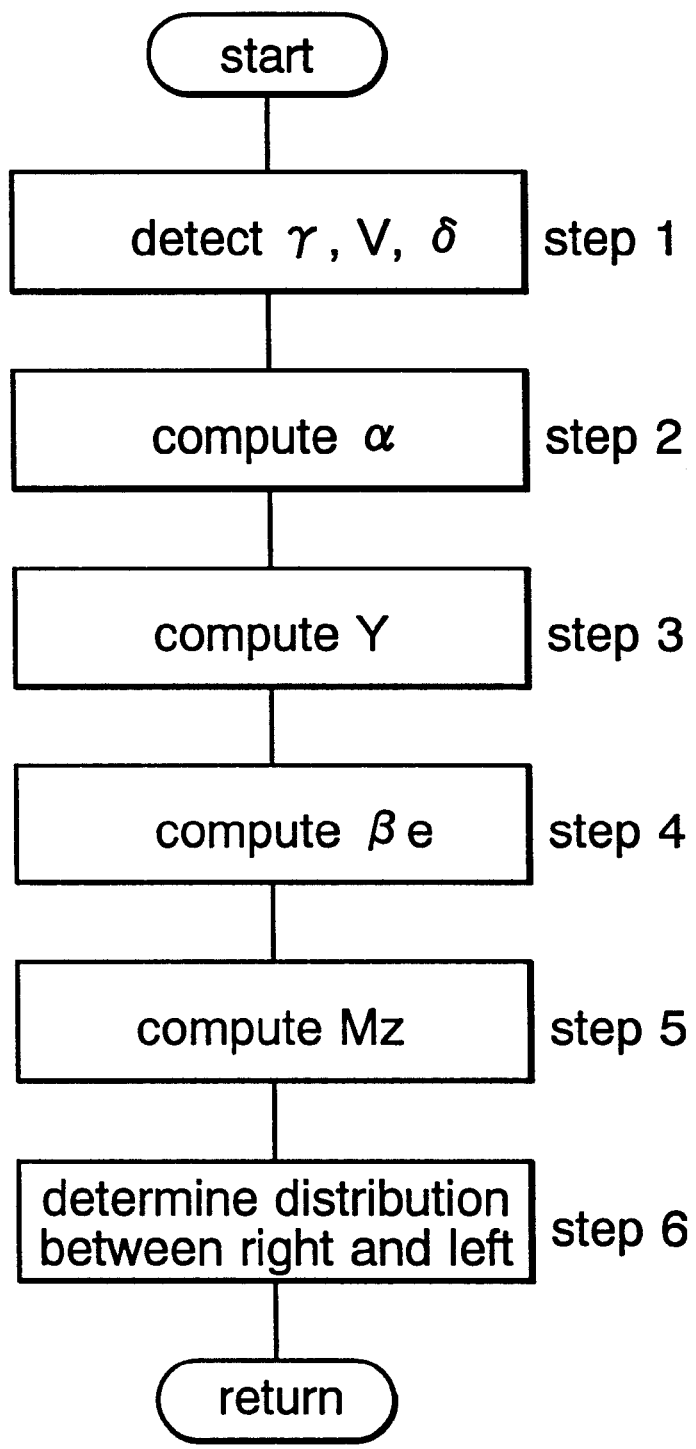
FIG. 1 is a basic flow chart of the control process embodying the present invention.
Figure 2:
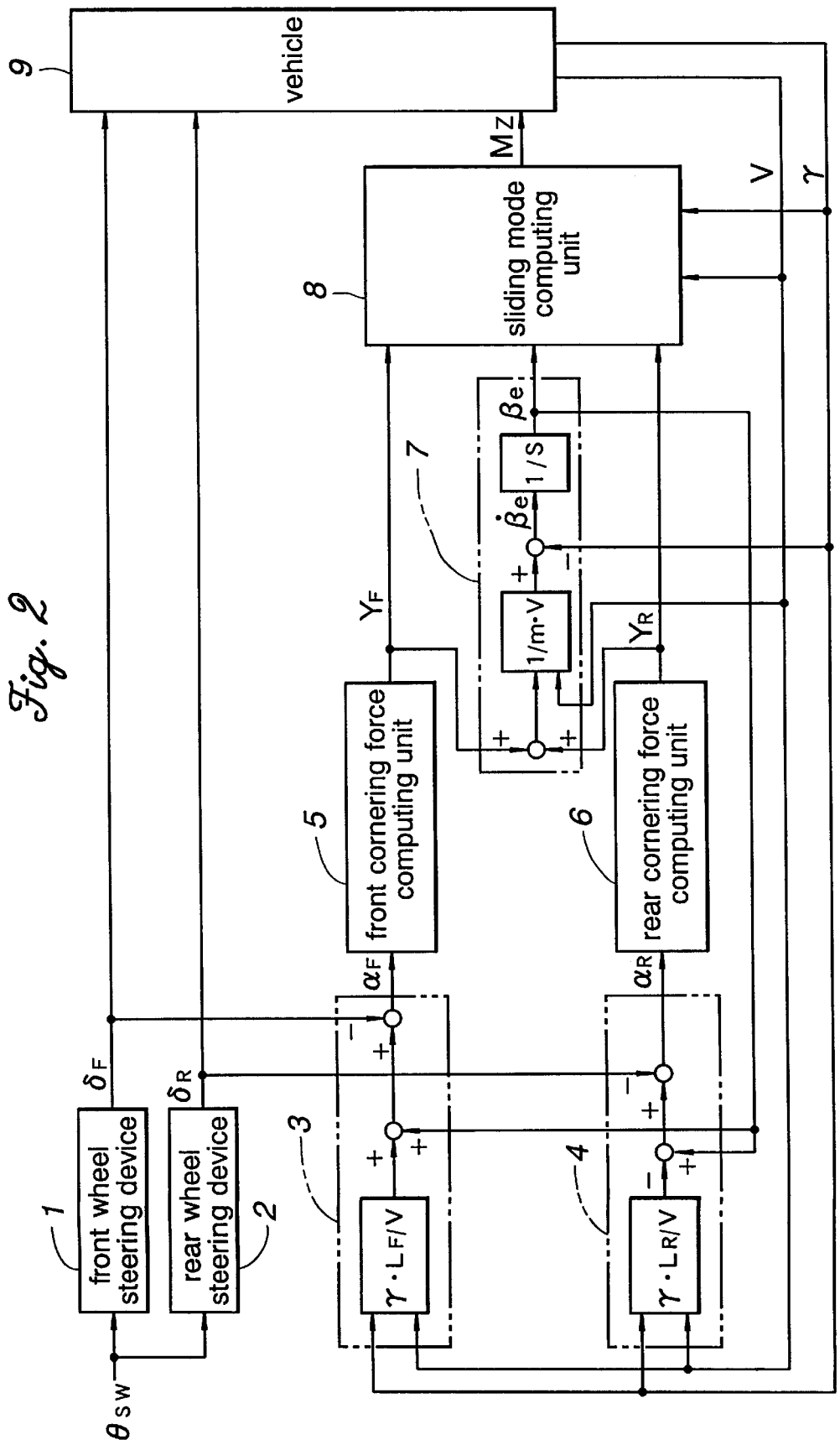
FIG. 2 is a block diagram of the control system for a four-wheel steering vehicle for executing the steps illustrated in FIG. 1.

Now the control algorithm of the present invention is described in the following in more detail with reference to the flow chart of FIG. 1 and the block diagram of FIG. 2.

First of all, the steering wheel angle $\theta_{SW}$ of the steering wheel is transmitted to the front steering device 1 and the rear steering device 2, and gives rise to the front wheel steering angle $\delta_F$ and the rear wheel steering angle $\delta_R$, respectively. Various state variables of the vehicle (such as yaw rate $\gamma$, vehicle speed V, and road wheel steering angles $\delta$) are also detected at this time (step 1).

Then, the tire slip angles $\alpha$ of the front and rear wheels are obtained from the following equations which are incorporated in tire slip angle computing units 3 and 4 according to the steering angle information and the vehicle speed information (step 2).

$$\alpha_F = \beta_e + (L_F/V)\gamma - \delta_F \text{ (front wheels)} \quad (10\text{-}1)$$

$$\alpha_R = \beta_e - (L_R/V)\gamma - \delta_R \text{ (rear wheels)} \quad (10\text{-}2)$$

where $\alpha_F$: front wheel slip angle, $\alpha_R$: rear wheel slip angle, $\beta_e$: hypothetical vehicle body slip angle, $\delta_F$: front wheel steering angle, and $\delta_R$: rear wheel steering angle.

The initial values of the tire slip angles $\alpha$ and the hypothetical vehicle body slip angle $\beta_e$ are assumed to be reset to value zero when the steering angles $\delta$ and the yaw rate $\gamma$ are both zero.

The tire slip angles $\alpha$ are substituted into the following equation (Equation (11)) for the dynamic model of the tires incorporated in cornering force computing units 5 and 6 to produce the cornering forces Y of the front and rear wheels (step 3).

$$Y = -(\mu C \alpha - \mu^2 C^2 \alpha^2 / 4\mu W) \cdot \{1 - (X/\mu W)^2\}^{1/2} \text{ when } |\alpha| < 2W/C$$

$$Y = -\mu W \{1 - (X/\mu)^2\}^{1/2} \text{ when } |\alpha| > 2W/C \quad (11)$$

where $\mu$: frictional coefficient between the road surface and the tires,

C: cornering power,

W: road contact load, and

X: fore-and-aft forces. $\mu$ may consist of a value near 1, or a value estimated by a known method.

C is a value obtained from a predetermined map given as a mathematical function of $\mu$ and W. W is a value compensated by the longitudinal and lateral accelerations or a value obtained from a load sensor installed in a wheel suspension system. X consists of a value estimated from the acceleration (deceleration) or obtained from the brake fluid pressure or the engine output. The cornering force Y may be obtained from the equation of the dynamic model of the tire (Equation (11)) while keeping the fore-and-aft force Z at zero, and the road contact load W at a fixed value. In this case, the accuracy in the estimation of the hypothetical vehicle body slip angle $\beta_e$ may diminish, but the stability of the vehicle movement control would not be adversely affected to any substantial extent.

Based on the front wheel cornering force $Y_F$ and the rear wheel cornering force $Y_R$, a hypothetical vehicle body slip angle computing unit 7 produces a hypothetical vehicle body slip angle $\beta_e$ (step 4). In this case, the hypothetical vehicle body slip angle $\beta_e$ is obtained by differentiating the hypothetical vehicle body slip angle, and then integrating it according to the following equation.

$$d\beta_e/dt = (Y_F + Y_R)/mV - \gamma \quad (12)$$

$$\beta_e = \int \{[(Y_F + Y_R)/mV] - \gamma\} dt \quad (13)$$

By feeding back this hypothetical vehicle body slip angle $\beta_e$ to the tire slip angle computing units 3 and 4, a practically adequate approximate value of the vehicle body slip angle can be obtained as a result. This is then forwarded to a sliding mode computing unit 8 which is characterized by the previously mentioned Equation (8) to produce a yawing moment Mz which serves as the basis for converging the vehicle body slip angle to zero (step 5). Based on this value, the fore-and-aft forces $X_R$ and $X_L$ of the right and left tires are determined in a manner similar to that mentioned in connection with the prior art (step 6), and the vehicle 9 is controlled accordingly.

In this control algorithm, the frictional coefficient $\mu$ between the road surface and the tire is not defined as a variable but as a fixed value, for instance 1. This, however, ensures the stability of the vehicle movement control. The feasibility of this point is discussed in the following.

<EMBODIMENT #1—EXAMPLE #1>

Figure 3:
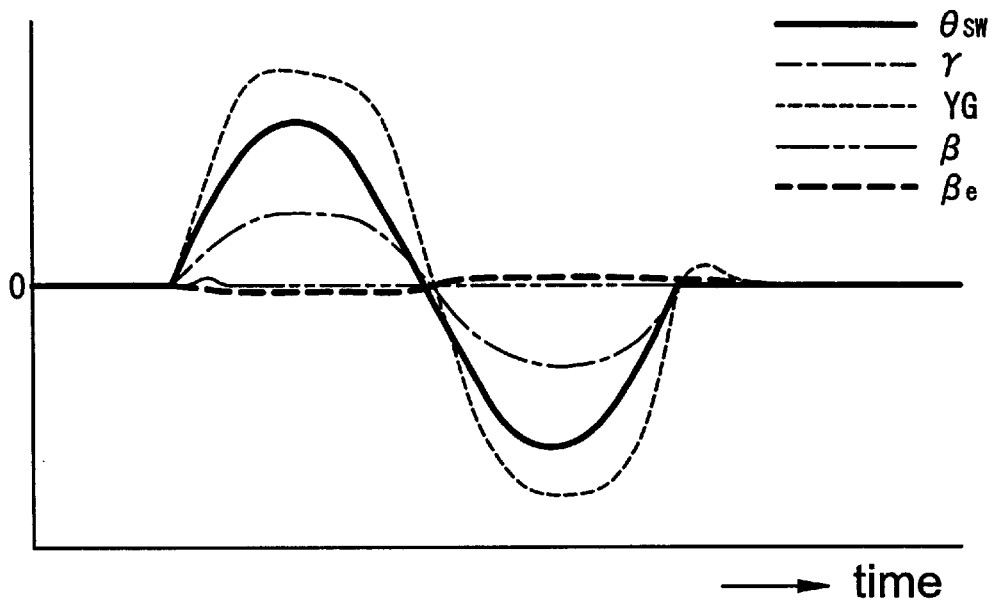
FIG. 3 is a graph showing the behavior of the vehicle given as a first example of a first embodiment of the present invention.

FIG. 3 shows a case where the actual frictional coefficient $\mu$ is 1.0, the assumed frictional coefficient $\mu$ is 1.0, and the steering wheel is turned by 60 degrees in each direction while the vehicle decelerates from the initial speed of 120 km/h at the rate of −0.4 G. In this case, the hypothetical vehicle body slip angle $\beta_e$ agrees with the actual vehicle body slip angle $\beta$, and the yaw rate $\gamma$ and the lateral acceleration YG follow the steering angle of the steering wheel without any phase delay. In other words, a significant improvement can be made in the vehicle movement under extreme conditions if the assumed frictional coefficient $\mu$ and the actual frictional coefficient $\mu$ agree with each other.

<EMBODIMENT #1—EXAMPLE #2>

Figure 4:
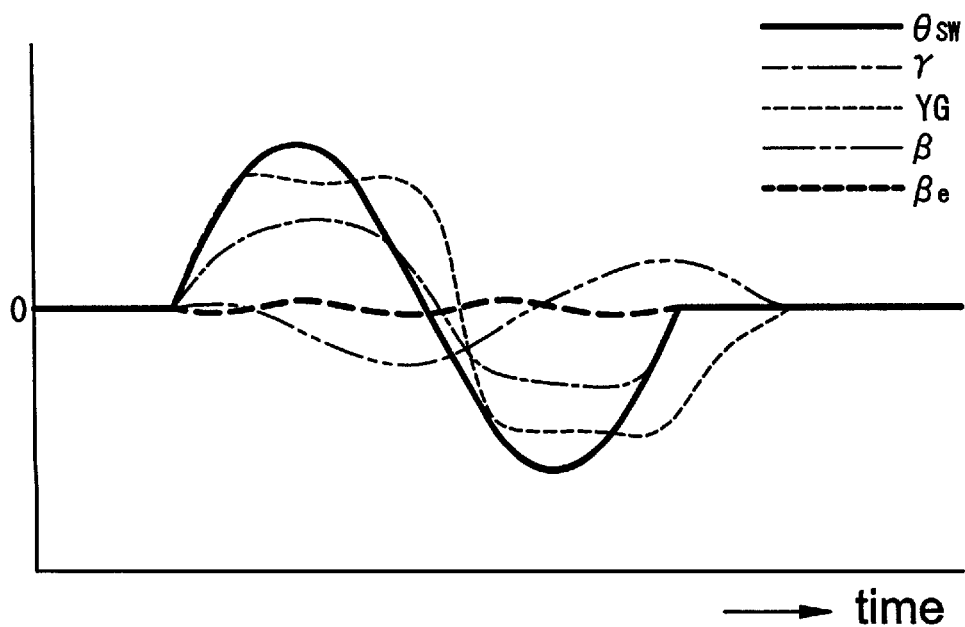
FIG. 4 is a graph showing the behavior of the vehicle given as a second example of the first embodiment of the present invention.

FIG. 4 shows a case where the actual frictional coefficient $\mu$ is 0.5, the assumed frictional coefficient $\mu$ is 1.0, and the steering wheel is turned by 60 degrees in each direction while the vehicle decelerates from the initial speed of 100 km/h at the rate of −0.2 G. In this case, whereas the actual vehicle body slip angle $\beta$ deviates from the hypothetical vehicle body slip angle $\beta_e$ which tends to converge to zero, the yaw rate $\gamma$ demonstrates an adequate tracking property. In other words, if the assumed frictional coefficient $\mu$ is greater than the actual frictional coefficient $\mu$, the stability of the vehicle movement can be maintained even though there is some phase delay in the lateral acceleration YG.

<EMBODIMENT #1—EXAMPLE #3>

Figure 5:
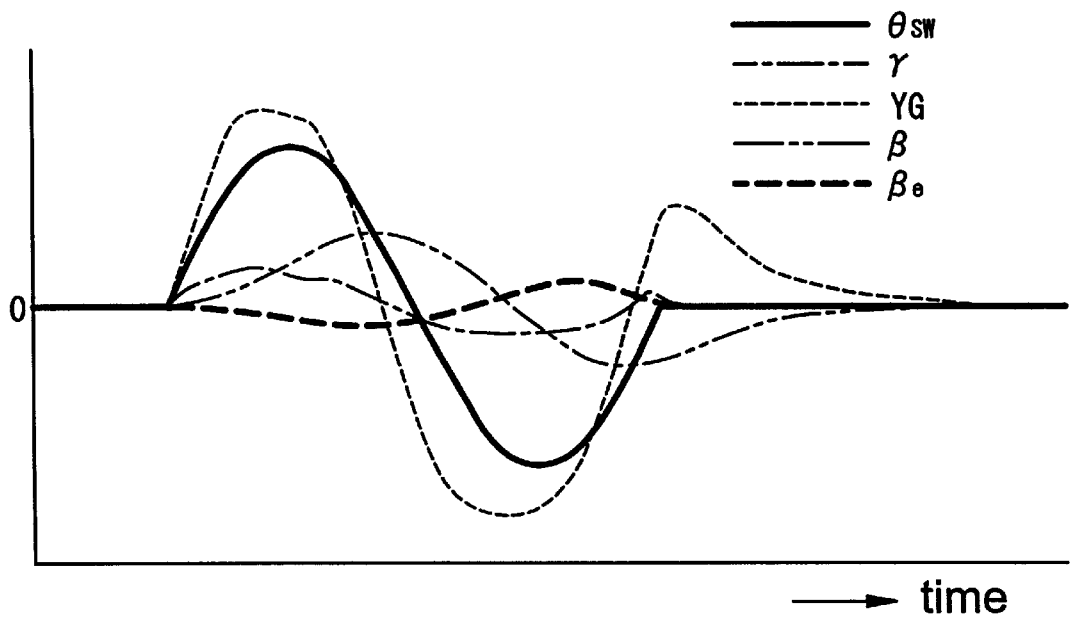
FIG. 5 is a graph showing the behavior of the vehicle given as a third example of the first embodiment of the present invention.

FIG. 5 shows a case where the actual frictional coefficient $\mu$ is 1.0, the assumed frictional coefficient $\mu$ is 0.5, and the steering wheel is turned by 60 degrees in each direction while the vehicle decelerates from the initial speed of 120 km/h at the rate of −0.4 G. In this case, the hypothetical vehicle body slip angle $\beta_e$ is opposite in phase to the actual vehicle body slip angle $\beta$, and, probably for this reason, the yaw rate $\gamma$ is relatively low while the lateral acceleration YG overshoots. The response and stability are both inferior. This is probably due to the fact that when the assumed frictional coefficient $\mu$ is smaller than the actual frictional coefficient $\mu$, only the tire which is lower in performance than that of the internal tire dynamic model is taken into consideration.

Thus, it can be seen from above that setting the assumed frictional coefficient $\mu$ higher than the actual frictional coefficient $\mu$ would not create any significant problem for the stability and response of the vehicle. It can therefore be fixed at 1 for practical purposes, but it is also possible to change the assumed frictional coefficient $\mu$ by a number of steps, for instance, depending on the fine, raining and snowing conditions.

Figure 8:
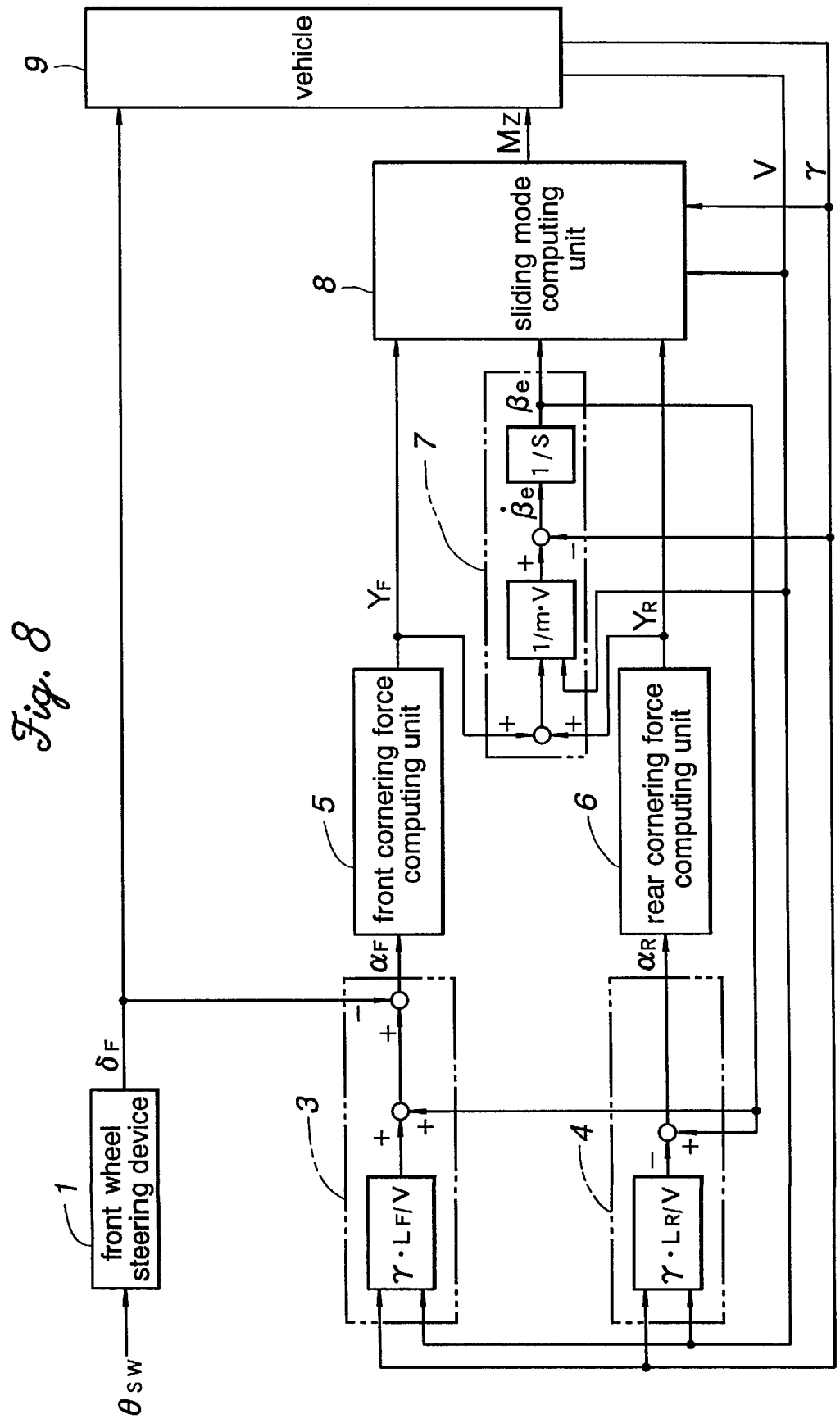
FIG. 8 is a block diagram of the control system for a front-wheel steering vehicle given as a second embodiment of the present invention.
Figure 9:
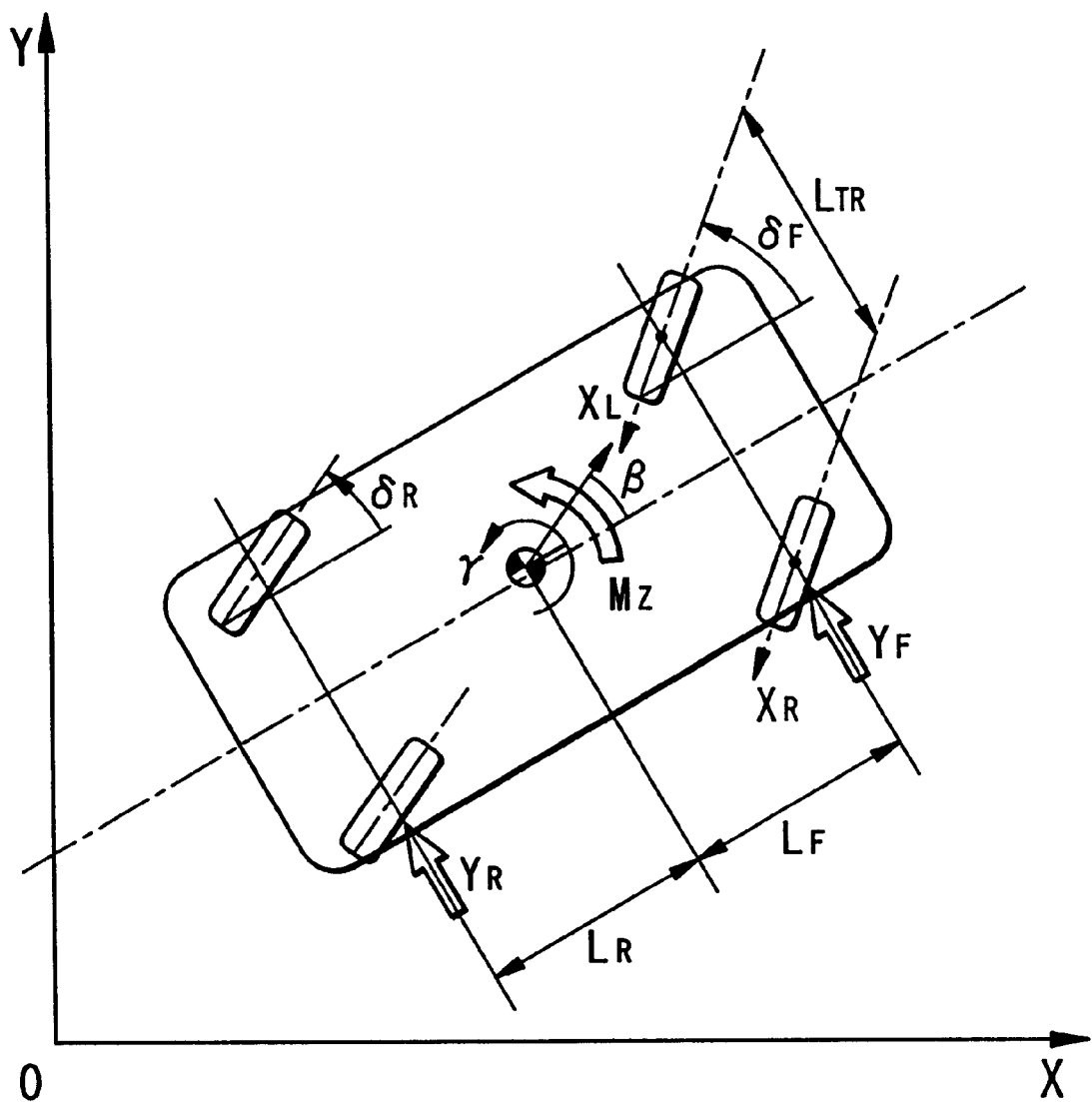
FIG. 9 is a diagram showing a planar movement of the vehicle.

The above discussion was directed to the application of the present invention to a four-wheel steering vehicle, but the present invention is equally applicable to vehicles which are steered only by the front wheels (second embodiment). In this case, as illustrated in FIG. 8, the terms related to the rear wheel steering angle disappear. In other words, the same treatment can be extended simply by setting the rear wheel steering angle to zero ($\beta_R$=0).

<EMBODIMENT #2—EXAMPLE #1>

Figure 6:
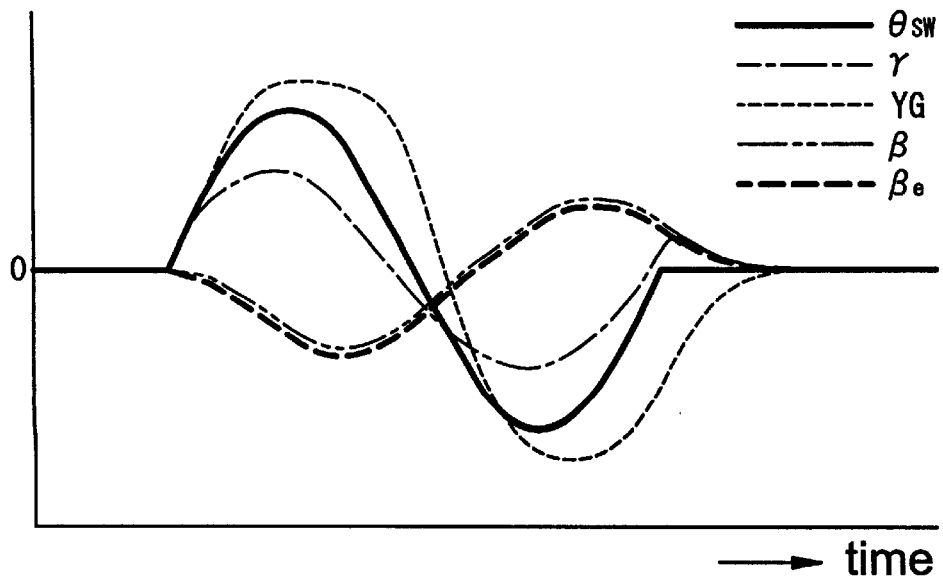
FIG. 6 is a graph showing the behavior of the vehicle given as a first example of the second embodiment of the present invention.

FIG. 6 shows a case where the actual frictional coefficient $\mu$ is 1.0, the assumed frictional coefficient $\mu$ is 1.0, and the steering wheel is turned by 60 degrees in each direction while the vehicle decelerates from the initial speed of 120 km/h at the rate of −0.4 G. In this case, the hypothetical vehicle body slip angle $\beta_e$ agrees with the actual vehicle body slip angle $\beta$, and the stability and response both improved. <EMBODIMENT #2—EXAMPLE #2>

Figure 7:
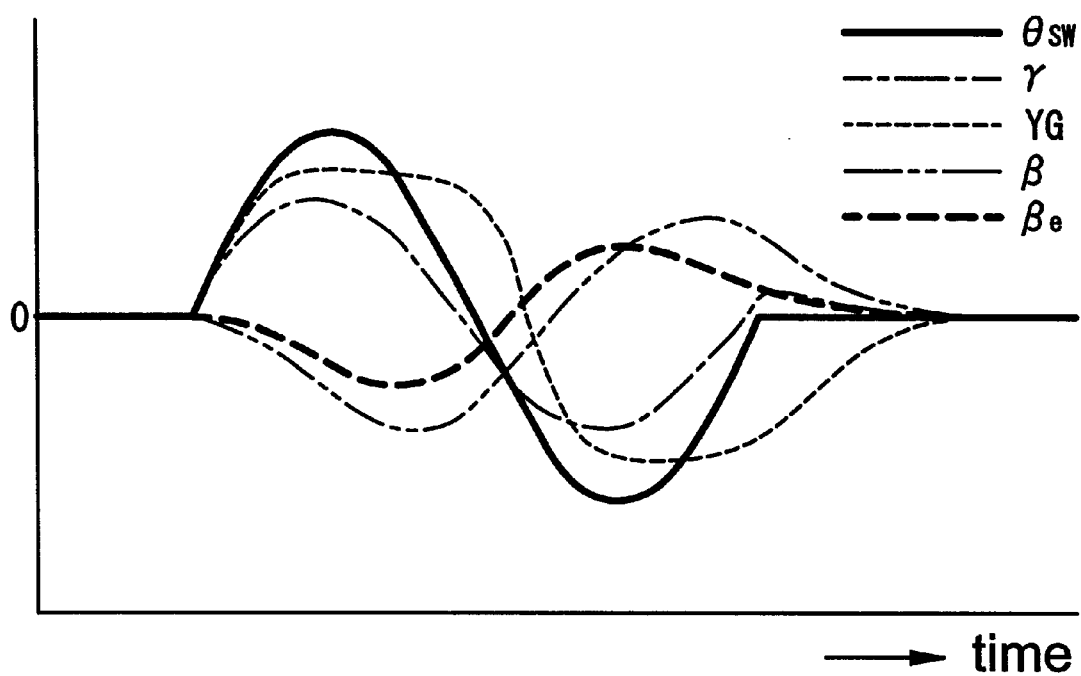
FIG. 7 is a graph showing the behavior of the vehicle given as a second example of the second embodiment of the present invention.

FIG. 7 shows a case where the actual frictional coefficient $\mu$ is 0.5, the assumed frictional coefficient $\mu$ is 1.0, and the steering wheel is turned by 60 degrees in each direction while the vehicle decelerates from the initial speed of 100 km/h at the rate of −0.2 G. In this case, the overall trends are identical to those of the four-wheel steering vehicle. In other words, if the assumed frictional coefficient $\mu$ is greater than the actual frictional coefficient $\mu$, the stability of the vehicle movement can be maintained although there may be some phase delay in the lateral acceleration YG.

Equations (12) and (13) given above can give the vehicle slip angle at high precision if the fore-and-aft speed $V_x$ of the vehicle body is sufficiently greater than the vehicle body slip angle $V_y$, and the changes in the fore-and-aft speed $V_x$ are relatively small, but under extreme conditions when such a relation does not hold, the following more precise equations may be used.

$$dV_y/dt = (Y_F + Y_R)/m - \gamma V_x \quad (14)$$

$$V_y = \int \{(Y_F + Y_R)/m - \gamma V_x\} dt \quad (15)$$

$$\beta_e = \tan^{-1}(V_y/V_x) \quad (16)$$

In this case, because the vehicle speed is typically measured by using a vehicle sensor for detecting the rotational speed of the wheel, the output of such a vehicle speed sensor may be used as the fore-and-aft speed $V_x$ of the vehicle body. A higher precision can be achieved if the vehicle speed V in Equations (12) and (13) are replaced by the fore-and-aft speed $V_x$ of the vehicle body.

Figure 10:
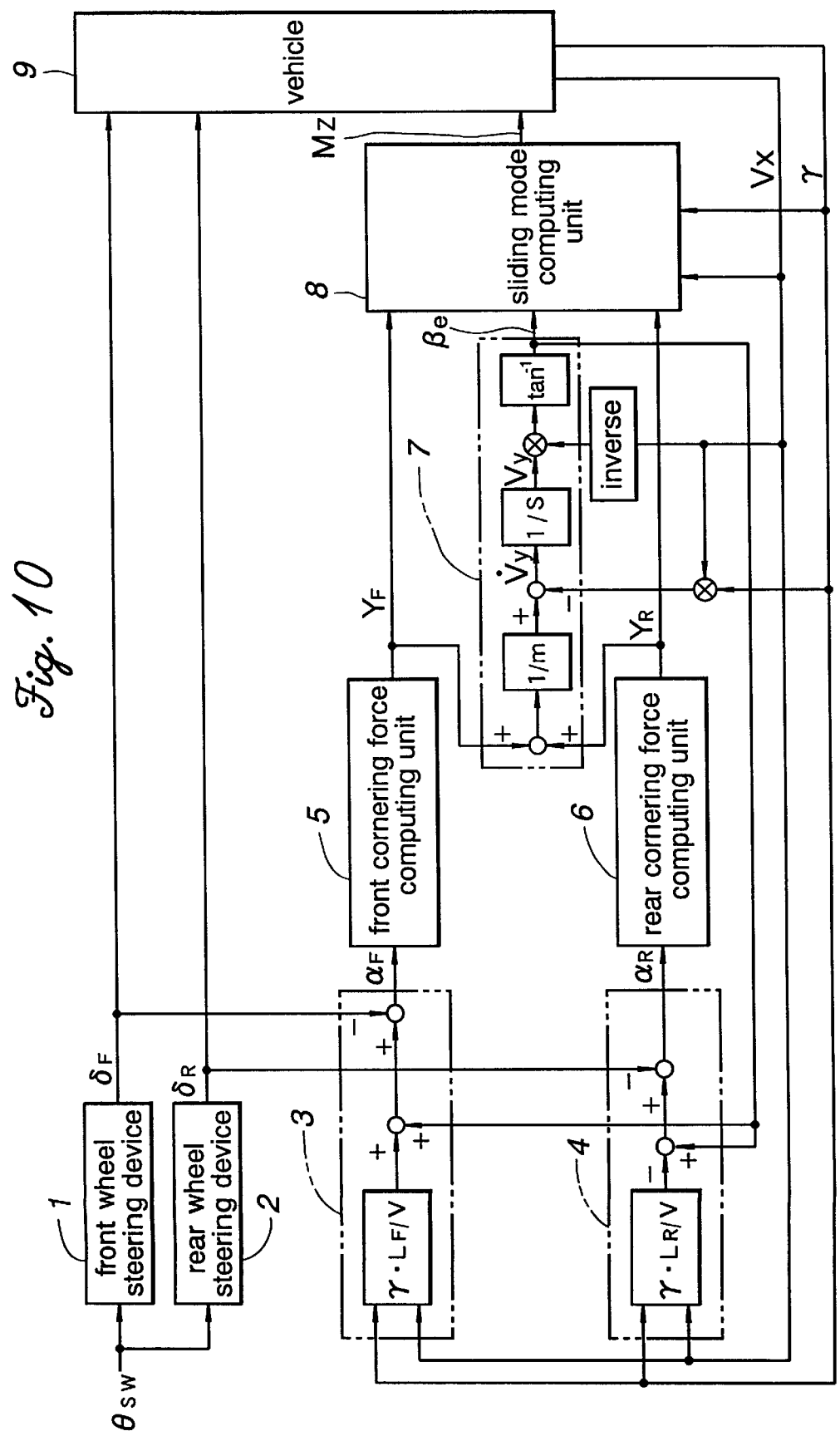
FIG. 10 is a view similar to FIG. 2 showing the control system for a four-wheel steering vehicle given as a third embodiment of the present invention using more precise equations for estimating the vehicle body slip angle.

FIG. 10 is a block diagram of a control system for a four-wheel steering vehicle given as a third embodiment of the present invention which uses these equations for more precisely estimating the vehicle body slip angle. It should be noted that the hypothetical vehicle body slip angle computing unit 7' is somewhat different from the hypothetical vehicle body slip angle computing unit 7 of the first embodiment illustrated in FIG. 2. The properties of the vehicle motion control in the third embodiment of the present invention are compared with those demonstrated when such a control process is absent by simulation.

<Example for Comparison #2 for Embodiment #3>

Figure 11:
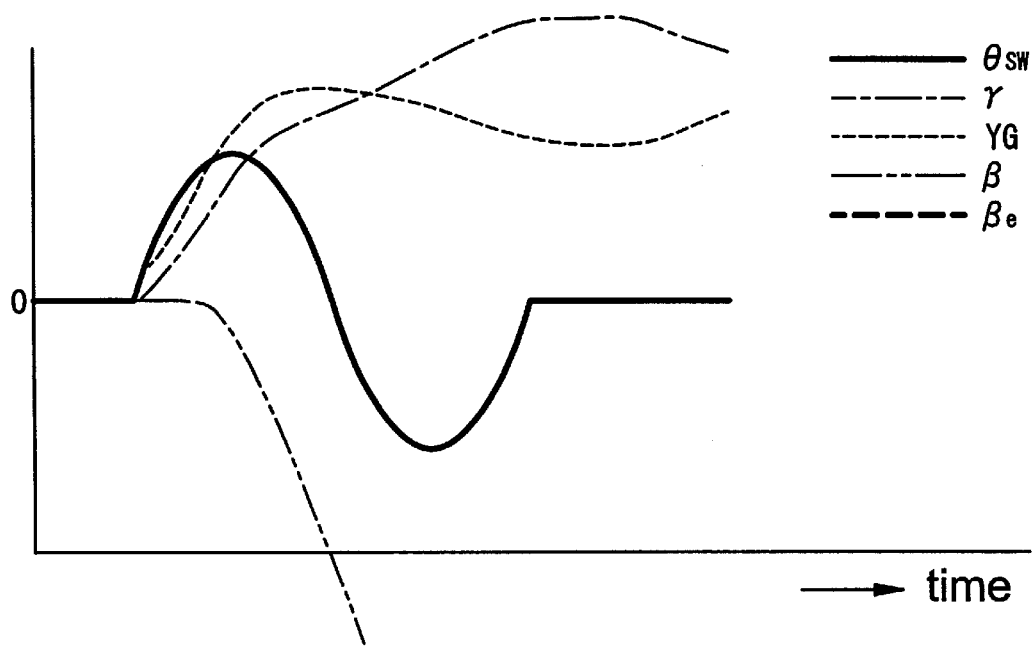
FIG. 11 is a graph showing the behavior of the vehicle according to a first example for comparison for the third embodiment of the present invention.

FIG. 11 shows a case where the actual frictional coefficient $\mu$ is 1.0, and the steering wheel is turned by 60 degrees in each direction while the vehicle decelerates from the initial speed of 120 km/h at the rate of −0.4 G without carrying out the control process of the present invention. In this case, the vehicle body went into a spin, and the vehicle behavior was highly unstable.

<EMBODIMENT #3—EXAMPLE #1>

Figure 12:
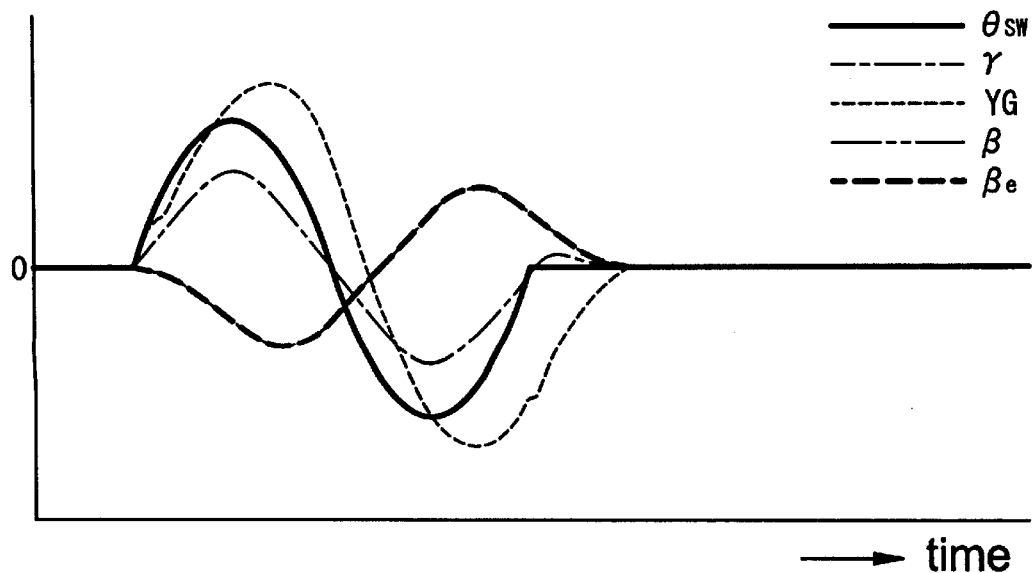
FIG. 12 is a graph showing the behavior of the vehicle given as a first example of the third embodiment of the present invention.

FIG. 12 shows a case where the actual frictional coefficient $\mu$ is 1.0, the assumed frictional coefficient $\mu$ is 1.0, and the steering wheel is turned by 60 degrees in each direction while the vehicle decelerates from the initial speed of 120 km/h at the rate of −0.4 G. In this case, the hypothetical vehicle body slip angle $\beta_e$ agrees with the actual vehicle body slip angle $\beta$, and the yaw rate $\gamma$ and the lateral acceleration YG follow the steering angle of the steering wheel without any phase delay. In other words, a significant improvement can be made in the vehicle movement under extreme conditions if the assumed frictional coefficient $\mu$ and the actual frictional coefficient $\mu$ agree with each other.

<EMBODIMENT #3—EXAMPLE #2>

Figure 13:
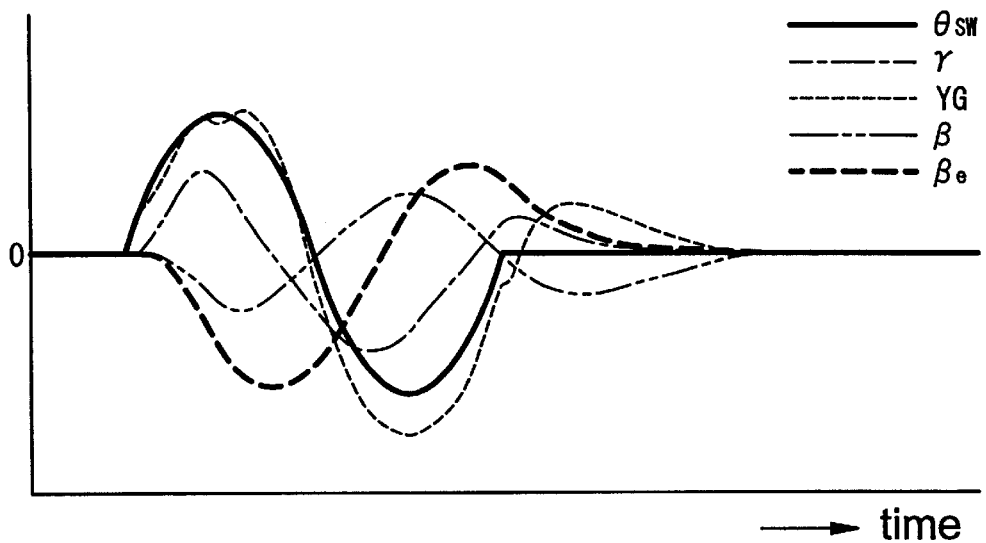
FIG. 13 is a graph showing the behavior of the vehicle given as a second example of the third embodiment of the present invention.

FIG. 13 shows a case where the actual frictional coefficient $\mu$ is 1.0, the assumed frictional coefficient $\mu$ is 0.2, and the steering wheel is turned by 60 degrees in each direction while the vehicle decelerates from the initial speed of 120 km/h at the rate of −0.4 G. In this case, even though the assumed frictional coefficient $\mu$ is lower than the actual frictional coefficient $\mu$, besides from a slight deviation of the actual vehicle body slip angle $\beta$ from the hypothetical vehicle body slip angle $\beta_e$, the stability of the vehicle motion is not impaired.

<Example for Comparison #2 for Embodiment #3>

Figure 14:
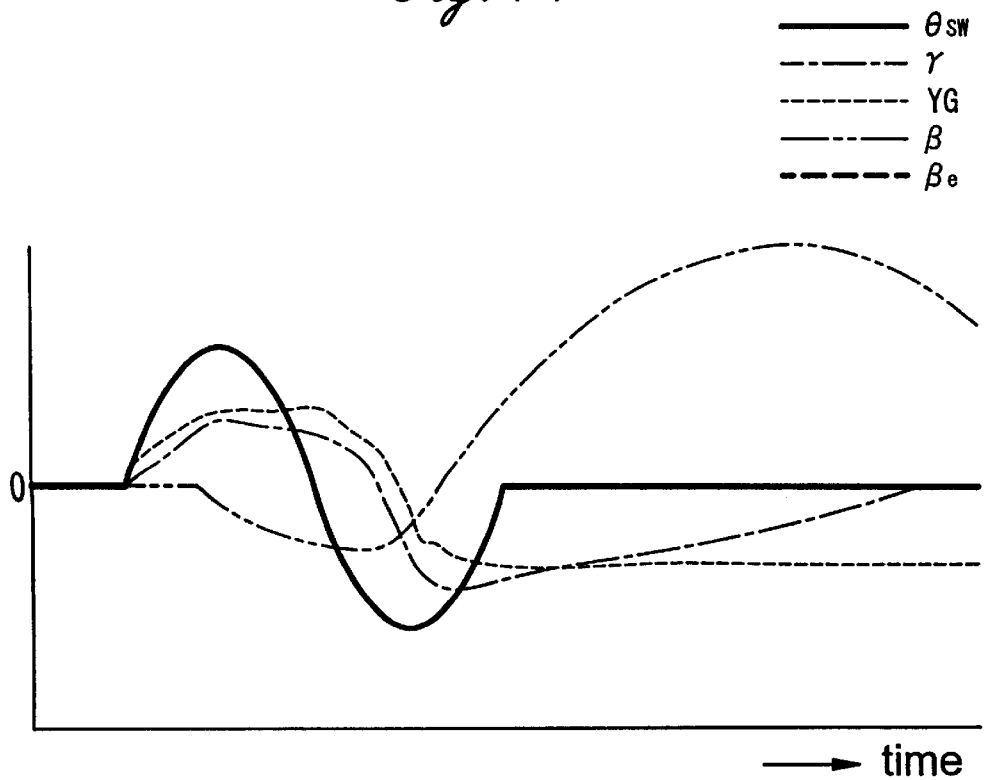
FIG. 14 is a graph showing the behavior of the vehicle given as a second example for comparison for the third embodiment of the present invention.

FIG. 14 shows a case where the actual frictional coefficient $\mu$ is 0.2, and the steering wheel is turned by 60 degrees in each direction while the vehicle decelerates from the initial speed of 120 km/h at the rate of −0.1 G without carrying out the control process of the present invention. In this case also, the vehicle body went into a spin, and the vehicle behavior was highly unstable.

<EMBODIMENT #3—EXAMPLE #3>

Figure 15:
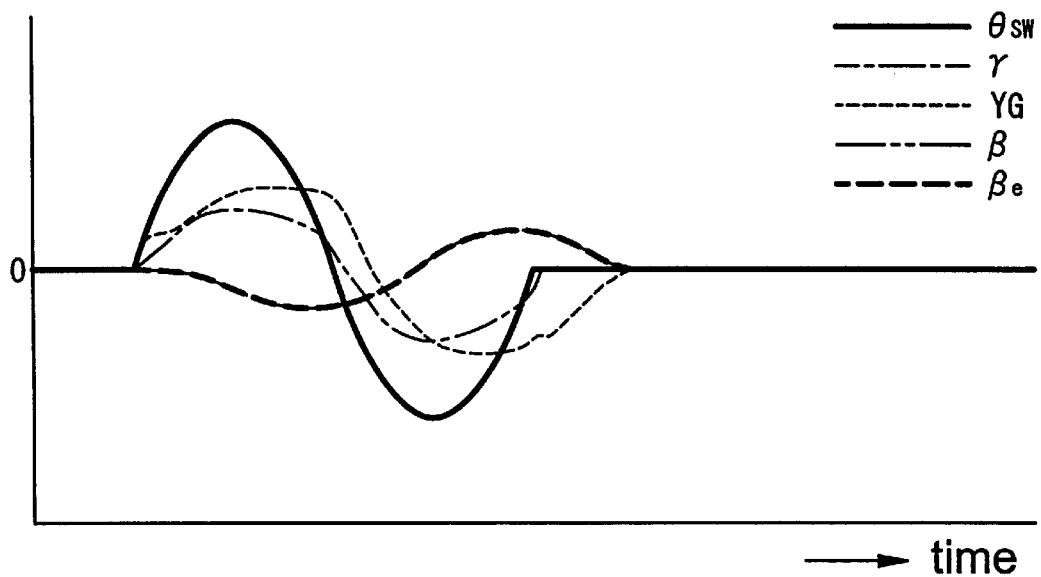
FIG. 15 is a graph showing the behavior of the vehicle given as a third example of the third embodiment of the present invention.

FIG. 15 shows a case where the actual frictional coefficient $\mu$ is 0.2, the assumed frictional coefficient $\mu$ is 0.2, and the steering wheel is turned by 60 degrees in each direction while the vehicle decelerates from the initial speed of 100 km/h at the rate of −0.1 G. In this case, the hypothetical vehicle body slip angle $\beta_e$ agrees with the actual vehicle body slip angle $\beta$, and the yaw rate $\gamma$ and the lateral acceleration YG follow the steering angle of the steering wheel without any phase delay. In other words, a significant improvement can be made in the vehicle movement under extreme conditions if the assumed frictional coefficient $\mu$ and the actual frictional coefficient $\mu$ agree with each other.

<EMBODIMENT #3—EXAMPLE #4>

Figure 16:
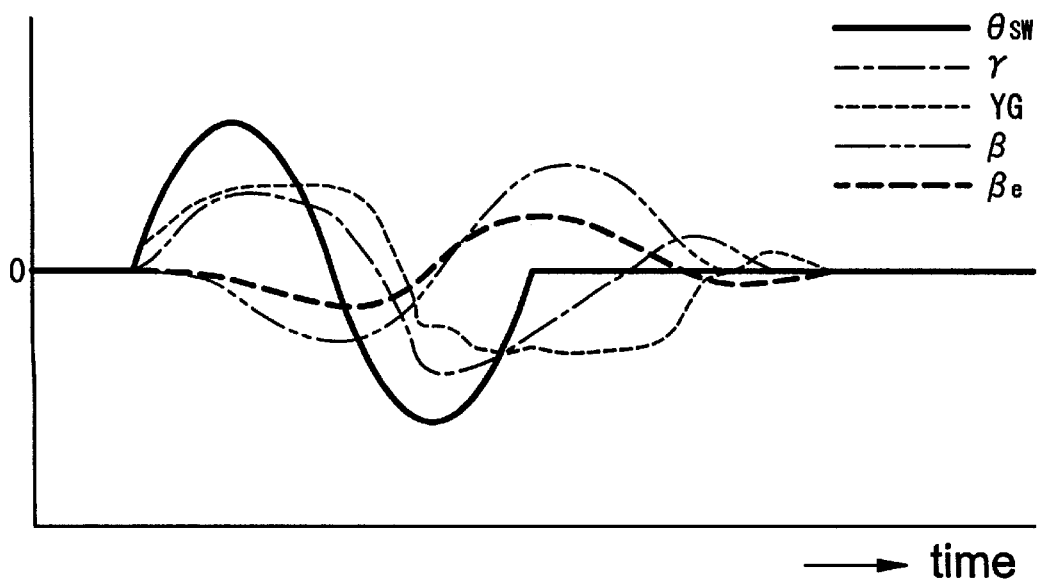
FIG. 16 is a graph showing the behavior of the vehicle given as a fourth example of the third embodiment of the present invention.

FIG. 16 shows a case where the actual frictional coefficient $\mu$ is 0.2, the assumed frictional coefficient $\mu$ is 1.0, and the steering wheel is turned by 60 degrees in each direction while the vehicle decelerates from the initial speed of 100 km/h at the rate of −0.1 G. In this case, because the assumed frictional coefficient $\mu$ is higher than the actual frictional coefficient $\mu$ contrary to the case of Embodiment #2—2, the deviation of the actual vehicle body slip angle $\beta$ from the hypothetical vehicle body slip angle $\beta_e$ is even smaller, and a fairly high level of stability can be attained.

As described above, according to the present invention, a vehicle body slip angle can be determined both accurately and promptly for application to a vehicle movement control, and although the frictional coefficient between the tires and the road surface which is an essential data for the tire model for the vehicle movement control, an arbitrarily assumed frictional coefficient is found to be adequate for practical purpose. In particular, when the assumed frictional coefficient is higher than the actual frictional coefficient, favorable control results were obtained. It was however discovered that the knowledge of the actual frictional coefficient highly beneficial for even more precise and stable control results.

Figure 17:
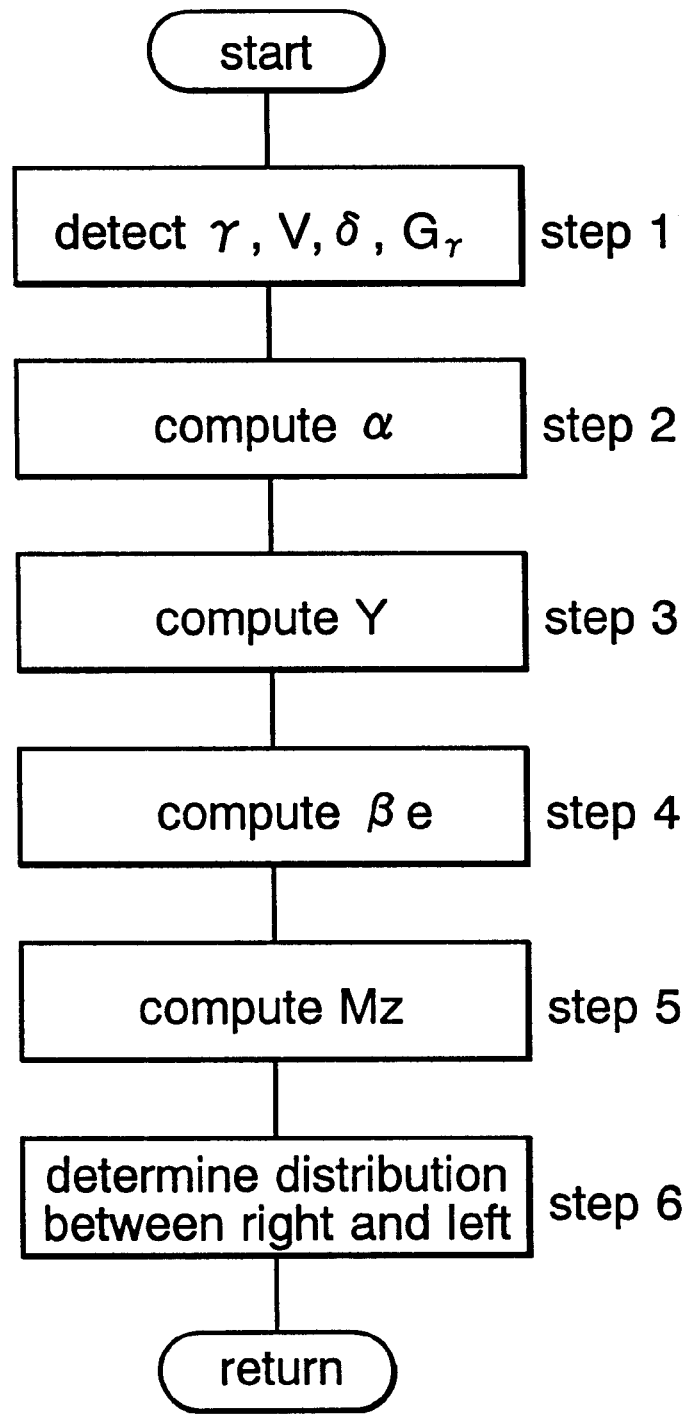
FIG. 17 is a basic flow chart of the control process given as a fourth embodiment of the present invention.
Figure 18:
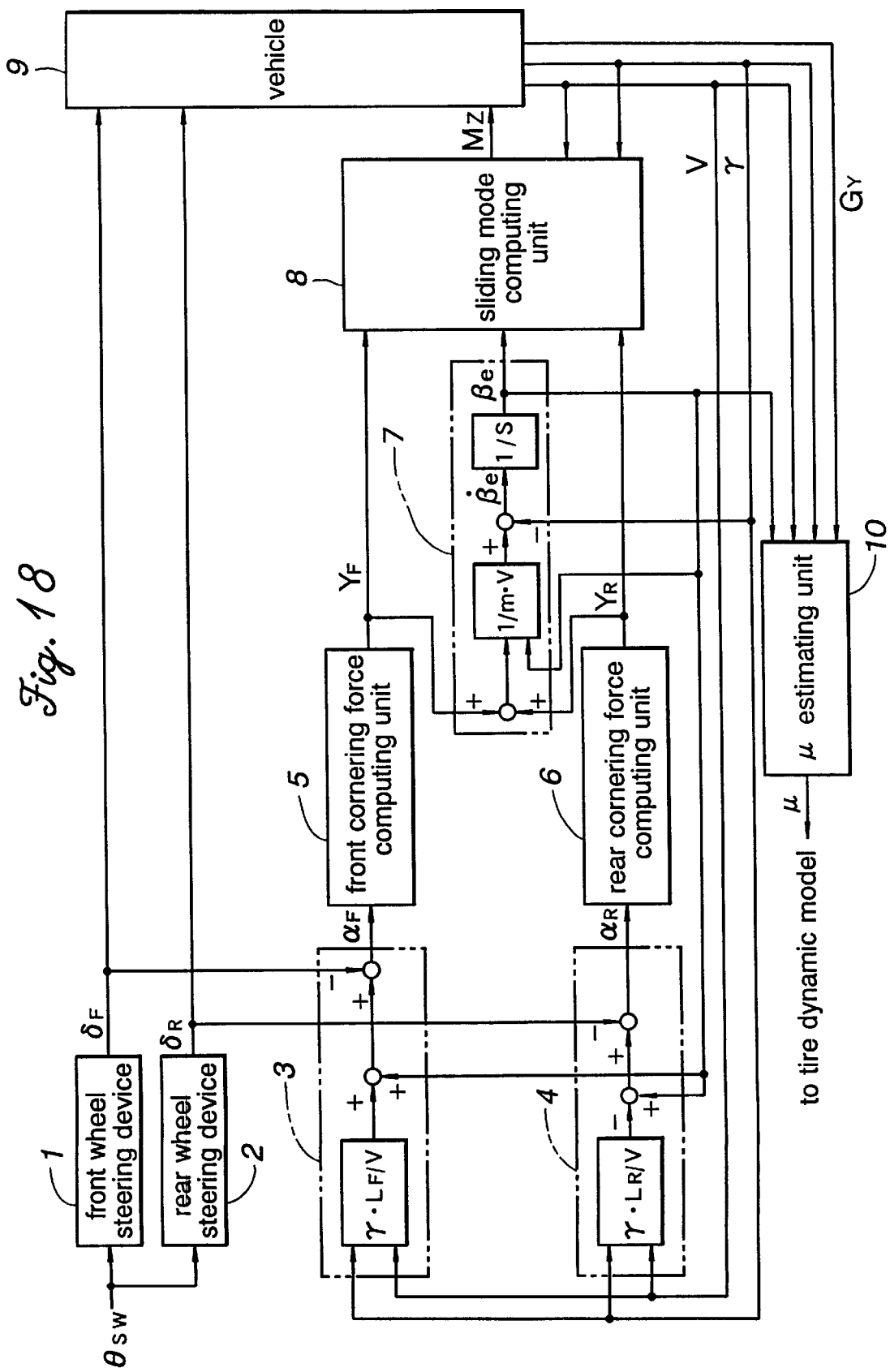
FIG. 18 is a block diagram of the control system for a four-wheel steering vehicle for executing the steps illustrated in FIG. 17.
Figure 19:
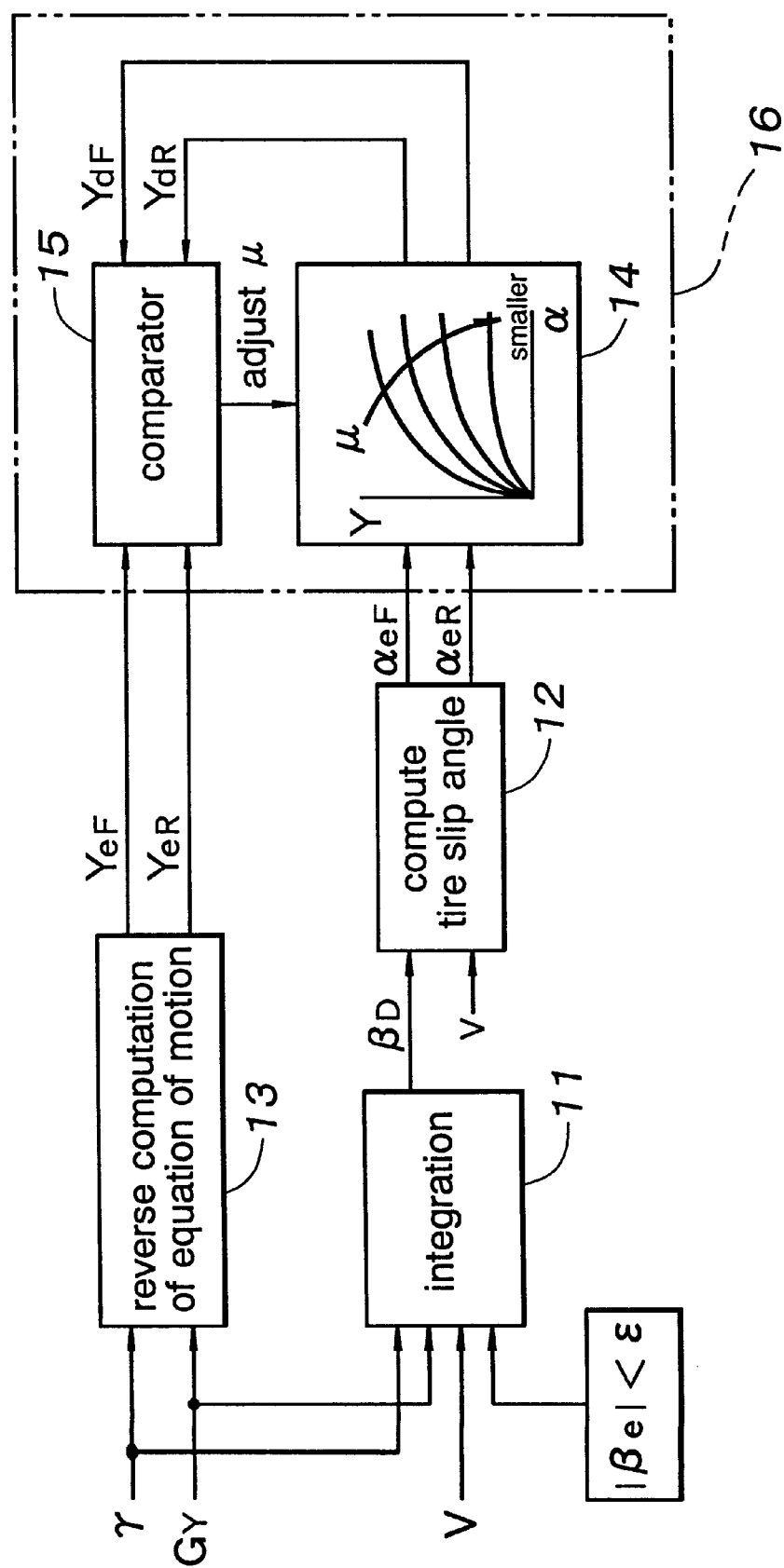
FIG. 19 is an internal block diagram of the $\mu$ estimating unit shown in FIG. 18.
Figure 20:
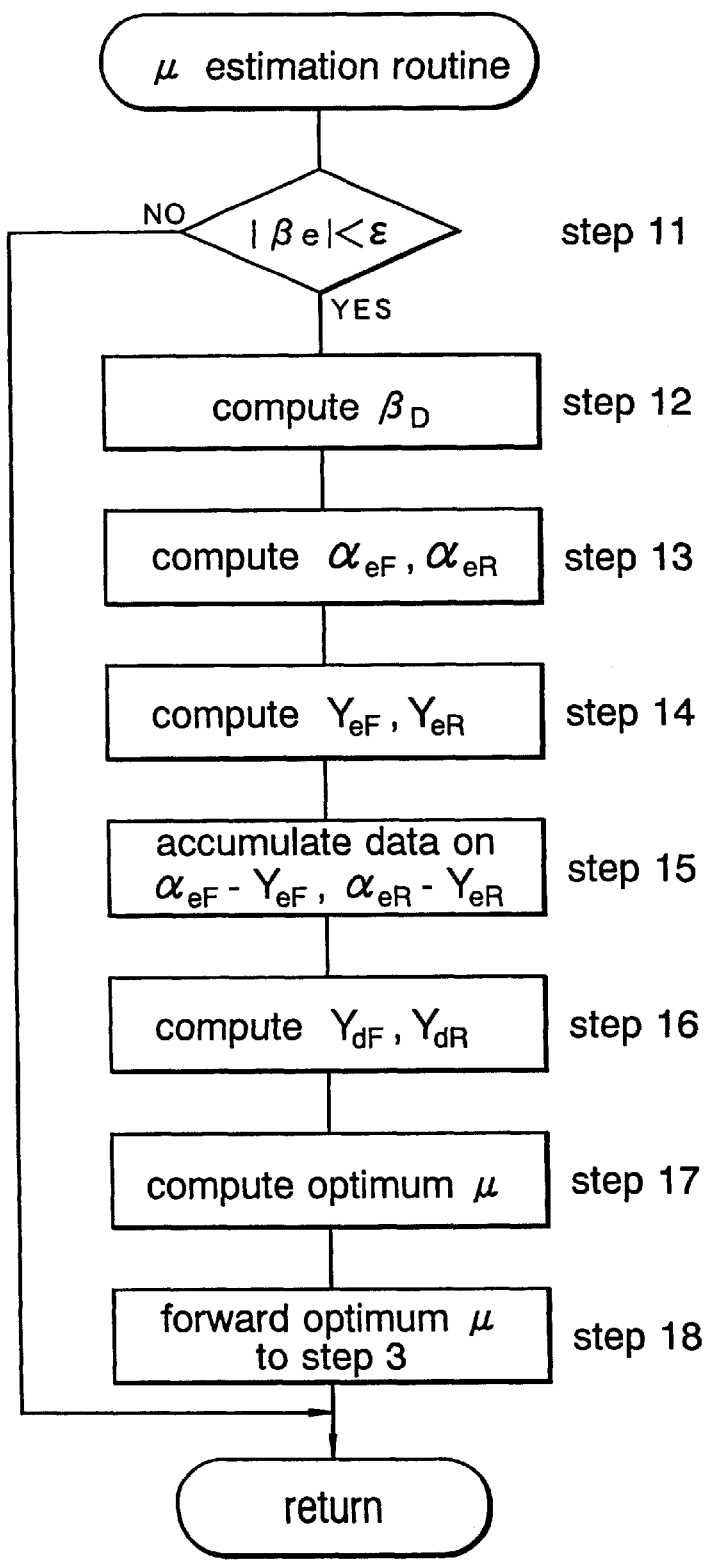
FIG. 20 is a flow chart of the process for estimating $\mu$.

FIGS. 17 and 18 illustrate a control arrangement based on such a consideration, and the control system is incorporated with means for estimating the frictional coefficient between the tires and the road surface. Now the control algorithm of this aspect of the present invention is described in the following in more detail with reference to the flow chart of FIG. 17 and the block diagram of FIG. 18.

First of all, the steering wheel angle $\theta_{SW}$ of the steering wheel is transmitted to the front steering device 1 and the rear steering device 2, and gives rise to the front wheel steering angle $\delta_F$ and the rear wheel steering angle $\delta_R$, respectively. Various state variables of the vehicle (such as yaw rate $\gamma$, vehicle speed V, road wheel steering angles $\delta$, and lateral acceleration $G_Y$) are also detected at this time (step 1).

Then, the tire slip angles $\alpha$ of the front and rear wheels are obtained from Equations (10-1) and (10-2) which are mentioned earlier, and incorporated in tire slip angle computing units 3 and 4 according to the steering angle information $\delta$ and the vehicle speed information V (step 2) similarly as in the first embodiment.

The tire slip angles $\alpha$ are substituted into Equation (11) for the dynamic model of the tires incorporated in cornering force computing units 5 and 6 to produce the cornering forces Y of the front and rear wheels (step 3).

Based on the front wheel cornering force $Y_F$ and the rear wheel cornering force $Y_R$, a hypothetical vehicle body slip angle computing unit 7 produces a hypothetical vehicle body slip angle $\beta_e$ (step 4). In this case, the hypothetical vehicle body slip angle $\beta_e$ is obtained by differentiating the hypothetical vehicle body slip angle, and then integrating it according to Equations (12) and (13) which are also given earlier.

By feeding back this hypothetical vehicle body slip angle $\beta_e$ to the tire slip angle computing units 3 and 4, a practically adequate approximate value of the vehicle body slip angle can be obtained as a result. This is then forwarded to a sliding mode computing unit 8 which is characterized by Equation (1) mentioned in connection with the prior art to produce a yawing moment Mz which serves as the basis for converging the vehicle body slip angle to zero (step 5). Based on this value, the fore-and-aft forces $X_R$ and $X_L$ of the right and left tires are determined (step 6), and the vehicle 9 is controlled accordingly.

The control stability would not be impaired for any practical purpose even when the frictional coefficient $\mu$ between the tire and the road surface which is used in the tire dynamic model (Equation (11)) incorporated in cornering force computing units 5 and 6 is set at an appropriate fixed value near 1, but it was confirmed that a higher precision in the value of $\mu$ is beneficial in improving the response. Therefore, according to this aspect of the present invention, the value of $\mu$ is estimated from the lateral acceleration $G_Y$, the vehicle speed V and the yaw rate $\gamma$ which are relatively easy to directly detect, and this value of $\mu$ is used in the processing of Step 3. The operation of a $\mu$ estimating unit 10 for estimating the value of $\mu$ is now described in the following with reference to FIGS. 3 and 5.

The computation of the hypothetical vehicle body slip angle $\beta_e$ using the cornering forces Y computed from the tire dynamic model (Equation (11)) is continually executed in the processing of step 4. The time point when the absolute value of $\beta_e$ falls below a certain value near zero is determined (step 11). When the absolute value of $\beta_e$ falls below this value near zero, the detected values of the lateral acceleration $G_Y$, yaw rate $\gamma$, and the vehicle speed are supplied to an integrator 11, and an estimated vehicle body slip angle $\beta_D$ is obtained from the following equation (step 12).

$$\beta_D = \int \{(G_Y/V) - \gamma\}dt, \quad T = \int dt \tag{17}$$

When the absolute value of $\beta_e$ falls below this value near zero, the computed value of the estimated vehicle body slip angle $\beta_D$ is reset, and the integration is started in such a manner that the computation of $\beta_D$ takes place only for a prescribed time period (such as T=2–3 seconds) when the absolute value of the change rate of the steering angle is less than a prescribed value. By repeating this, it is possible to avoid accumulating integration errors.

The thus obtained estimated vehicle body slip angle $\beta_D$ is supplied to an estimated vehicle body slip angle computing unit 12, and the estimated tire slip angle $\alpha_e$ is obtained for each of the front and rear wheels from the following equations (step 13).

$$\alpha_{eF} = \beta_D + (L_F/V)\gamma - \delta_F \tag{18-1}$$

$$\alpha_{eR} = \beta_D + (L_R/V)\gamma - \delta_R \tag{18-2}$$

Meanwhile, only when the estimated vehicle body slip angle $\beta_D$ is being computed, the lateral acceleration $G_Y$ and yaw rate $\gamma$ corresponding to this time period are supplied to an estimated cornering force computing unit 13, and the estimated cornering force $Y_e$ is obtained from the equations of motions as a reverse computation for each of the front and rear wheels (step 14).

$$Y_{eF} = \frac{1}{2}L\{m \cdot L_R \cdot G_Y + I(d\gamma/dt)\} \approx m_F \cdot G_{YF} \tag{19-1}$$

$$Y_{eR} = \frac{1}{2}L\{m \cdot L_F \cdot G_Y + I(d\gamma/dt)\} \approx m_R \cdot G_{YR} \tag{19-2}$$

where
$m_F$: mass of the front axle
$m_R$: mass of the rear axle $G_{YF}$: lateral acceleration at the front axle
$G_{YR}$: lateral acceleration at the rear axle
L: wheel base ($L_R+L_L$)

The thus obtained estimated cornering forces $Y_{eF}$ and $Y_{eR}$ and the estimated tire slip angles $\alpha_{eF}$ and $\alpha_{eR}$ are supplied to a $\mu$ computing unit 16. Data on the relationship between the estimated cornering forces $Y_e$ and the estimated tire slip angles $\alpha_e$ is built up (step 15). Once it is judged that a sufficient amount of data has been built up (for instance the data includes the case of slip angles of five degrees or more), the estimated tire slip angles $\alpha_e$ are supplied to a tire property model 14 of the vehicle in which the experimentally obtained relationship between the tire slip angle $\alpha$, the cornering force Y and the frictional coefficient $\mu$ between the tire and the road surface is stored in advance in the form of a map. The hypothetical cornering force $Y_d$ is then obtained from each of the right and left wheels while varying $\mu$ from 0 to 1.2 (step 16).

The hypothetical cornering forces $Y_{dF}$ and $Y_{dR}$ obtained from the data on this relationship, and the estimated cornering forces $Y_{eF}$ and $Y_{eR}$ are supplied to a comparator 15 to obtain the value of $\mu$ which minimizes the average root-mean-squares of the deviations (step 17), and the computation of step 3 is carried by using this optimized value of $\mu$ (step 18).

Such a processing procedure is executed in a sequential manner (at an appropriate frequency) when the vehicle is traveling without any acceleration or deceleration so that the vehicle movement control may be carried out on a real time basis by taking into account the current changes in the condition of the road surface.

Equations (6) and (7) given above produce the vehicle body slip angle at a high precision if the fore-and-aft speed $V_x$ of the vehicle body is sufficiently greater than the vehicle body slip angle $V_y$, and the changes in the fore-and-aft speed $V_x$ are relatively small, but under extreme conditions when such a relation does not hold, Equations (14) to (16) may be used instead of Equations (12) and (13).

Figure 21:
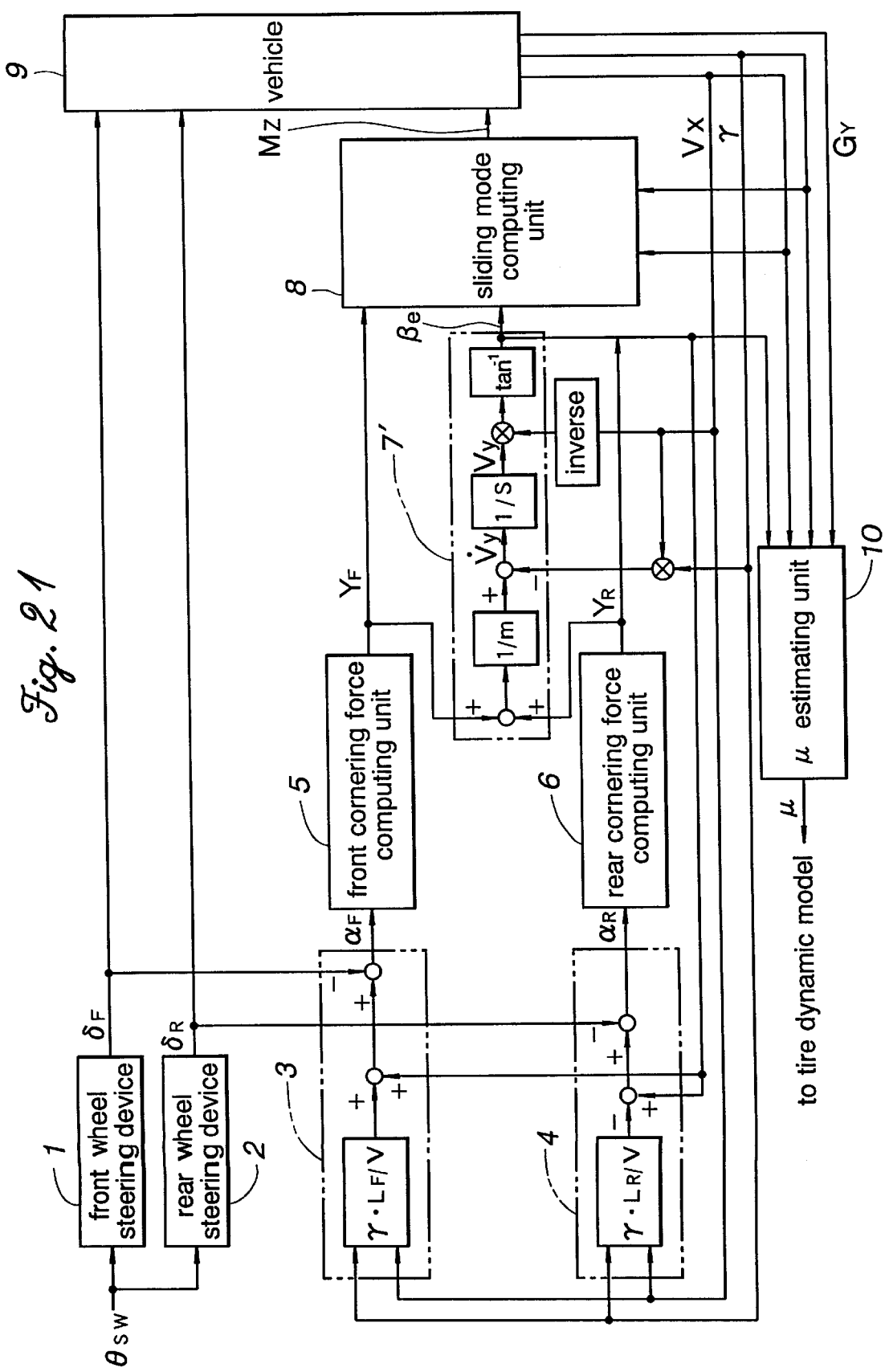
FIG. 21 is a view similar to FIG. 18 illustrating the fifth embodiment of the present invention in which more precise equations are used for estimating the vehicle body slip angle.

FIG. 21 is a block diagram of a control system for a four-wheel steering vehicle given as a fifth embodiment of the present invention which uses these equations for more precisely estimating the vehicle body slip angle. It should be noted that the hypothetical vehicle body slip angle computing unit 7' in this case is different from the hypothetical vehicle body slip angle computing unit 7 of the fourth embodiment illustrated in FIG. 18.

The above discussion was directed to the application of the present invention to a four-wheel steering vehicle, but the present invention is equally applicable to vehicles which are steered only by the front wheels as can be readily appreciated from the comparison of the first and second embodiments.

Thus, according to the present invention, in the vehicle movement control, the vehicle movement can be controlled with an adequate response and stability for practical purposes even without accurately determining the frictional coefficient between the road surface and the tire, and the knowledge of the frictional coefficient based on an estimation from the dynamic behavior of the vehicle can even further improve the performance of the control process. Therefore, the overall structure of the system can be simplified, and the manufacturing cost can be reduced. Therefore, a significant progress can be made in providing a vehicle operation assist system of a high performance.

Although the present invention has been described in terms of preferred embodiments thereof, it is obvious to a person skilled in the art that various alterations and modifications are possible without departing from the scope of the present invention which is set forth in the appended claims.

What is claimed is:

1. A method for computing a vehicle body slip angle in a vehicle movement control, comprising the steps of:

computing a tire slip angle $\alpha$ from a yaw rate $\gamma$, a vehicle speed V, a vehicle body slip angle $\beta$ which is given as an initial value or a preceding computed value and a road wheel steering angle $\delta$;

computing a cornering force Y from a dynamic model of the tire by taking into account at least the tire slip angle $\alpha$; and computing a hypothetical vehicle body slip angle $\beta_e$ from the cornering force Y, the vehicle speed V and the yaw rate $\gamma$;

wherein the tire slip angle $\alpha$ is computed by feeding back only the hypothetical vehicle body slip angle $\beta_e$ while the yaw rate $\gamma$ and the vehicle speed V are based on measured values.

2. A method for computing a vehicle body slip angle in a vehicle movement control according to claim 1, wherein a frictional coefficient $\mu$ between the tire and the road surface in the tire dynamic model is fixed at a value in the vicinity of 1.0.

3. A method for computing a vehicle body slip angle in a vehicle movement control according to claim 1, further comprising the step of estimating the frictional coefficient between the tire and the road surface for use in the tire dynamic model according to a relation between a cornering force $Y_e$ computed from the yaw rate and a lateral acceleration $G_Y$ and a tire slip angle $\alpha_e$ computed from a vehicle body slip angle $\beta_D$ which is in turn computed from the yaw rate, the lateral acceleration and the vehicle speed.

4. A method for computing a vehicle body slip angle in a vehicle movement control according to claim 1, wherein said step of computing a hypothetical vehicle body slip angle $\beta_e$ from the cornering force Y, the vehicle speed V and the yaw rate $\gamma$ includes the use of the following equation;

$$\beta_e = \int \{[(Y_F+Y_R)/mV]-\gamma\} dt$$

where
 m: vehicle mass
 $Y_F$: front wheel cornering force (sum for right and left wheels)
 $Y_R$: rear wheel cornering force (sum for right and left wheels).

5. A method for computing a vehicle body slip angle in a vehicle movement control according to claim 1, wherein said step of computing a hypothetical vehicle body slip angle $\beta_e$ from the cornering force Y, the vehicle speed V and the yaw rate $\gamma$ includes the use of the following equations;

$$V_y = \int \{(Y_F+Y_R)/m - \gamma V_x\} dt$$

$$\beta_e = \tan^{-1}(V_y/V_x)$$

where
 m: vehicle mass
 $Y_F$: front wheel cornering force (sum for right and left wheels)
 $Y_R$: rear wheel cornering force (sum for right and left wheels).
 $V_x$: fore-and-aft speed of the vehicle.

6. A method for computing a vehicle body slip angle in a vehicle movement control according to claim 5, wherein said fore-and-aft speed $V_x$ of the vehicle is approximated by a wheel speed of said vehicle.

7. A system for computing a vehicle body slip angle in a vehicle movement control, comprising:
   a computing unit for computing a tire slip angle $\alpha$ from a yaw rate $\gamma$, a vehicle speed V, a vehicle body slip angle $\beta$ which is given as an initial value or a preceding computed value and a wheel steering angle $\delta$;
   a computing unit for computing a cornering force Y from a dynamic model of the tire by taking into account at least the tire slip angle $\alpha$; and
   a computing unit for computing a hypothetical vehicle body slip angle $\beta_e$ from the cornering force Y, the vehicle speed V and the yaw rate $\gamma$;
   wherein only the hypothetical vehicle body slip angle $\beta_e$ is fed back to the computing unit for computing the tire slip rate $\alpha$ while the yaw rate $\gamma$ and the vehicle speed V are based upon measured values.

8. A system for computing a vehicle body slip angle in a vehicle movement control according to claim 7, wherein a frictional coefficient $\mu$ between the tire and the road surface in the tire dynamic model is fixed at a value in the vicinity of 1.0.

9. A system for computing a vehicle body slip angle in a vehicle movement control according to claim 7, further comprising a computing unit for estimating the frictional coefficient between the tire and the road surface for use in the tire dynamic model according to a relation between a cornering force $Y_e$ computed from the yaw rate and a lateral acceleration $G_Y$ and a tire slip angle $\alpha_e$ computed from a vehicle body slip angle $\beta_D$ which is in turn computed from the yaw rate, the lateral acceleration and the vehicle speed.

10. A system for computing a vehicle body slip angle in a vehicle movement control according to claim 7, wherein said computing unit for computing a hypothetical vehicle body slip angle $\beta_e$ from the cornering force Y, the vehicle speed V and the yaw rate $\gamma$ uses the following equation;

$$\beta_e = \int \{[(Y_F + Y_R)/mV] - \gamma\} dt$$

where
   m: vehicle mass
   $Y_F$: front wheel cornering force (sum for right and left wheels)
   $Y_R$: rear wheel cornering force (sum for right and left wheels).

11. A system for computing a vehicle body slip angle in a vehicle movement control according to claim 7, wherein said computing unit for computing a hypothetical vehicle body slip angle $\beta_e$ from the cornering force Y, the vehicle speed V and the yaw rate $\gamma$ uses the following equations;

$$V_y = \int \{(Y_F + Y_R)/m - \gamma V_x\} dt$$

$$\beta_e = \tan^{-1}(V_y/V_x)$$

where
   m: vehicle mass
   $Y_F$: front wheel cornering force (sum for right and left wheels)
   $Y_R$: rear wheel cornering force (sum for right and left wheels)
   $V_x$: fore-and-aft speed of the vehicle.

12. A system for computing a vehicle body slip angle in a vehicle movement control according to claim 11, wherein said fore-and-aft speed $V_x$ of the vehicle is approximated by a wheel speed of said vehicle.

* * * * *